United States Patent
Decarreau et al.

(10) Patent No.: US 12,149,975 B2
(45) Date of Patent: Nov. 19, 2024

(54) DATA ACQUISITION IN A COMMUNICATION NETWORK

(71) Applicant: Nokia Technologies Oy, Espoo (FI)

(72) Inventors: Guillaume Decarreau, Munich (DE); Andreas Maeder, Würzburg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 60 days.

(21) Appl. No.: 17/641,785

(22) PCT Filed: Sep. 27, 2019

(86) PCT No.: PCT/EP2019/076131
§ 371 (c)(1),
(2) Date: Mar. 9, 2022

(87) PCT Pub. No.: WO2021/058107
PCT Pub. Date: Apr. 1, 2021

(65) Prior Publication Data
US 2024/0049020 A1  Feb. 8, 2024

(51) Int. Cl.
*H04W 24/10* (2009.01)
*G06F 9/50* (2006.01)

(52) U.S. Cl.
CPC .......... *H04W 24/10* (2013.01); *G06F 9/5005* (2013.01); *G06F 2209/504* (2013.01)

(58) Field of Classification Search
CPC .............. H04W 24/10; G06F 9/5005; G06F 2209/504; Y02D 10/00
See application file for complete search history.

(56) References Cited

U.S. PATENT DOCUMENTS

| 6,161,143 A * | 12/2000 | Tayama | G06Q 30/06 709/239 |
| 7,562,330 B1 * | 7/2009 | Wadland | G06F 30/394 716/129 |

(Continued)

FOREIGN PATENT DOCUMENTS

WO   2017/084713 A1   5/2017

OTHER PUBLICATIONS

"Revised SID☐Study on RAN-centric data collection and utilization for LTE and NR", 3GPP TSG RAN Meeting #81, RP-182105, Agenda: 9.3.13, CMCC, Sep. 10-13, 2018, 6 pages.

(Continued)

*Primary Examiner* — Christine Ng
(74) *Attorney, Agent, or Firm* — Robert P. Michal, Esq.; Carter, DeLuca & Farrell LLP

(57) ABSTRACT

Example embodiments enable controlling consumption of additional resources required for performing data collection in a radio access network by estimating costs associated with various data collection tasks. The costs may be exposed to data consumers such that is possible to keep the additional resource consumption within cost budget(s) allocated for particular data consumers, network nodes, and/or network interfaces. Example embodiments enable preventing excessive data collection load, which may be for example caused by various machine learning tasks performed at the radio access network. Apparatuses, methods, and computer programs are disclosed.

1 Claim, 6 Drawing Sheets

(56) References Cited

U.S. PATENT DOCUMENTS

| | | | | |
|---|---|---|---|---|
| 8,195,539 | B1* | 6/2012 | Mitchell | G06Q 30/04 |
| | | | | 705/34 |
| 10,432,551 | B1* | 10/2019 | Vosshall | H04L 47/783 |
| 2010/0173667 | A1* | 7/2010 | Hui | H04W 88/06 |
| | | | | 455/552.1 |
| 2013/0070671 | A1* | 3/2013 | Ezure | H04W 40/02 |
| | | | | 370/328 |
| 2015/0379408 | A1* | 12/2015 | Kapoor | G01W 1/10 |
| | | | | 706/46 |
| 2016/0285723 | A1* | 9/2016 | Hassan | H04L 43/16 |
| 2019/0026796 | A1* | 1/2019 | Dinis da Silva de Carvalho | |
| | | | | G06Q 50/40 |
| 2020/0019230 | A1* | 1/2020 | Rong | G06F 1/324 |
| 2021/0065049 | A1* | 3/2021 | Lehr | G06Q 10/063 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320, V15.0.0, Jun. 2018, pp. 1-27.
"IEEE 802.11", Wikipedia, Retrieved on Mar. 2, 2022, Webpage available at : https://en.wikipedia.org/wiki/IEEE_802.11.
International Search Report and Written Opinion received for corresponding Patent Cooperation Treaty Application No. PCT/EP2019/076131, dated Jun. 5, 2020, 15 pages.

* cited by examiner

DATA ACQUISITION IN A COMMUNICATION NETWORK

RELATED APPLICATION

This application was originally filed as PCT Application No. PCT/EP2019/076131 on Sep. 27, 2019, which is hereby incorporated in its entirety.

TECHNICAL FIELD

The present application generally relates to the field of data communications. In particular, some example embodiments of the present application relate to data acquisition in a radio access network for machine learning (ML) purposes.

BACKGROUND

In various wireless communication technologies machine learning, or more generally artificial intelligence (AI), may be used for various tasks such as for example optimization of the communication network. One characteristic of ML based solutions is that a lot of data may need to be collected to enable meaningful and useful inference based on the collected data. However, collection of such information may result in extensive resource use, for example due to increased load at various data interfaces and power consumption at various network entities.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide a system to enable controlling additional resource consumption due to data collection in a radio access network. This benefit is obtained by the features of the independent claims. Further implementation forms are provided in the dependent claims, the description, and the drawings.

According to a first aspect, an apparatus comprises at least one processor and at least one memory including computer program code, the at least one memory and the computer code configured to, with the at least one processor, cause the apparatus at least to: determine a cost budget associated with collecting network information; determine at least one cost value associated with collecting the network information; transmit an indication of the cost budget and the at least one cost value to a first network node; receive a first request for a set of network data from the first network node; transmit at least one second request for the set of network data to one or more second network nodes; receive the set of network data from the one or more second network nodes; and transmit the set of network data to the first network node.

According to a second aspect, a method comprises determining a cost budget associated with collecting network information; determining at least one cost value associated with collecting the network information; transmitting an indication of the cost budget and the at least one cost value to a first network node; receiving a first request for a set of network data from the first network node; transmitting at least one second request for the set of network data to one or more second network nodes; receiving the set of network data from the one or more second network nodes; and transmitting the set of network data to the first network node.

According to a third aspect, a computer program is configured, when executed by an apparatus, to cause the apparatus at least to: determine a cost budget associated with collecting network information; determine at least one cost value associated with collecting the network information; transmit an indication of the cost budget and the at least one cost value to a first network node; receive a first request for a set of network data from the first network node; transmit at least one second request for the set of network data to one or more second network nodes; receive the set of network data from the one or more second network nodes; and transmit the set of network data to the first network node.

According to a fourth aspect, an apparatus comprises means for determining a cost budget associated with collecting network information; means for determining at least one cost value associated with collecting the network information; means for transmitting an indication of the cost budget and the at least one cost value to a first network node; means for receiving a first request for a set of network data from the first network node; means for transmitting at least one second request for the set of network data to one or more second network nodes; means for receiving the set of network data from the one or more second network nodes; and means for transmitting the set of network data to the first network node.

According to a fifth aspect, an apparatus comprises at least one processor and at least one memory including computer program code, the at least one memory and the computer code configured to, with the at least one processor, cause the apparatus at least to: receive an indication of a cost budget and an indication of at least one first cost value associated with collecting network information; transmit a request for a set of network data, wherein the set of network data is determined based on the cost budget and the at least one first cost value; receive the set of network data; and execute a machine learning algorithm based on the set of network data.

According to a sixth aspect, a method comprises receiving an indication of a cost budget and an indication of at least one first cost value associated with collecting network information; transmitting a request for a set of network data, wherein the set of network data is determined based on the cost budget and the at least one first cost value; receiving the set of network data; and executing a machine learning algorithm based on the set of network data.

According to a seventh aspect, a computer program is configured, when executed by an apparatus, to cause the apparatus at least to: receive an indication of a cost budget and an indication of at least one first cost value associated with collecting network information; transmit a request for a set of network data, wherein the set of network data is determined based on the cost budget and the at least one first cost value; receive the set of network data; and execute a machine learning algorithm based on the set of network data.

According to an eight aspect, an apparatus comprises means for receiving an indication of a cost budget and an indication of at least one first cost value associated with collecting network information; means for transmitting a request for a set of network data, wherein the set of network data is determined based on the cost budget and the at least one first cost value; means for receiving the set of network data; and means for executing a machine learning algorithm based on the set of network data.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to an example embodiment, consumption of additional resources required for performing data collection in a radio access network may be controlled by estimating costs associated with various data collection tasks. The costs may be exposed to the data consumer such that is possible to keep the additional resource consumption within cost budget(s) allocated for particular data consumers, network nodes, and/or network interfaces. Example embodiments enable preventing excessive data collection load, which may be for example caused by various machine learning tasks performed at the radio access network.

Figure 1:
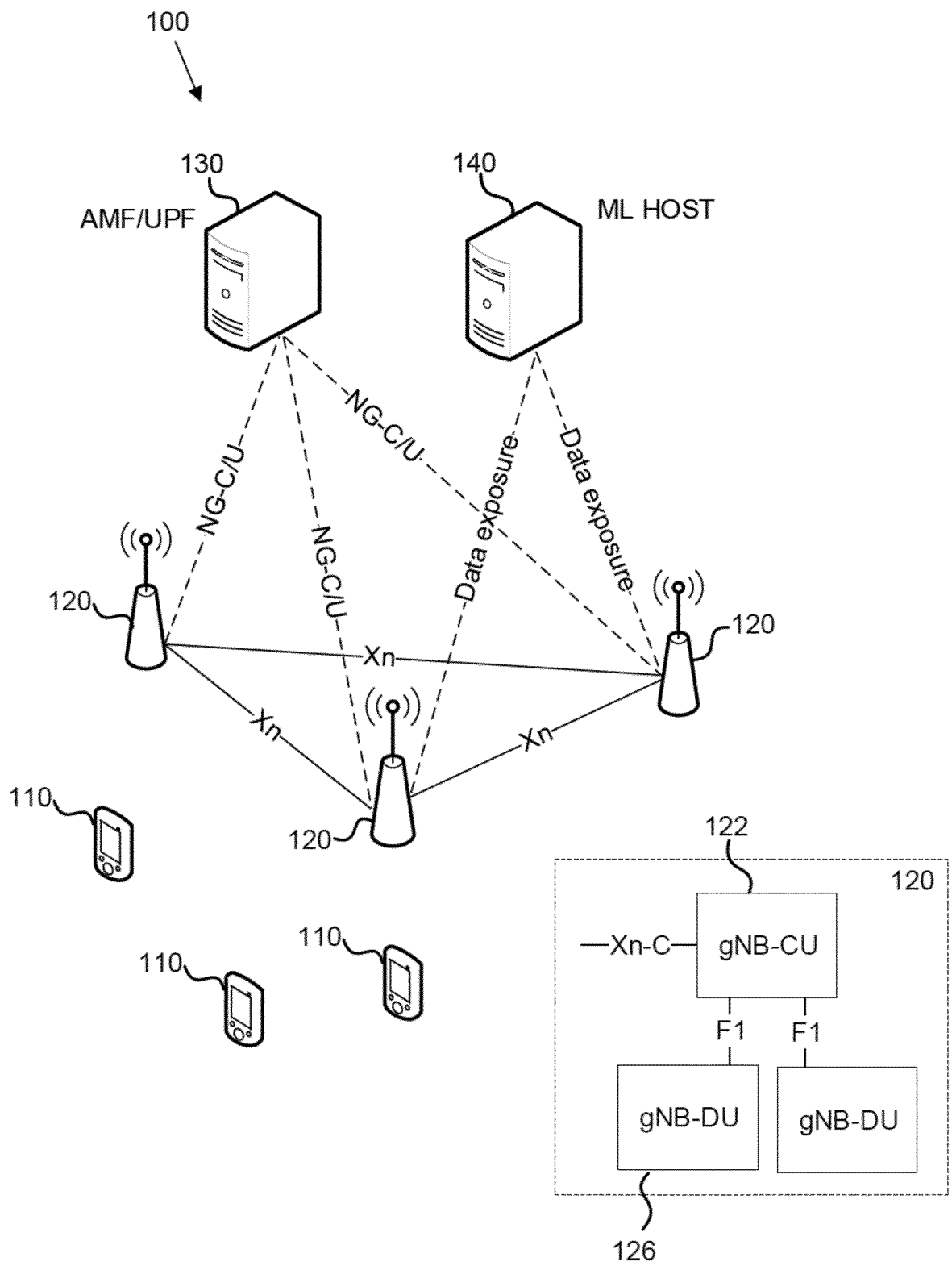
FIG. 1 illustrates an example of a network comprising different types of network nodes, according to an example embodiment.

FIG. 1 illustrates an example embodiment of a network 100. The network may comprise one or more core network elements such as for example Access and Mobility Management Function (AMF) and/or User Plane Function (UPF) 130, one or more base stations, represented in the example of FIG. 1 by gNBs 120, and/or user equipment (UE) 110. The network may further comprise one or more machine learning (ML) hosts or ML entities 140. The core network elements, base stations, ML hosts 140, and UEs 110 may be generally referred to as network nodes. UEs 110 may communicate with one or more of the base stations via wireless radio channel(s). The base stations may be configured to communicate with the core the network elements over a communication interface, such as for example control plane or user plane interface NG-C/U.

The one or more ML hosts 140 may be configured to collect data and to perform various training and/or inference functions based on the data, for example to optimize RAN parameters for each connection on the network 100. ML hosts 140 may be located outside a RAN node such as for example gNB 120. For example, in an O-RAN scenario ML host 140 could be for example comprised in a RAN intelligent controller (RIC), but ML host 140 may be comprised in other suitable network entities as well. ML hosts 140 may be connected to one or more base stations via a data exposure interface.

In a split architecture scenario, a base station, for example a gNB 120, may comprise a central unit, for example gNB-CU 122, and one or more distributed units, for example one or more gNB-DUs 126. The central unit may be a logical node and may include functions such as for example transfer of user data, mobility control, radio access network sharing, positioning, session management, or the like, except for functions that may be allocated to the distributed unit(s). The central unit may be connected to the one or more distributed units over a communication interface, for example an F1 interface. The one or more distributed units may be logical nodes that may be configured to provide a subset of base station functions, depending on how the functions are split between the central unit and the distributed unit(s). The distributed unit(s) may be controlled by the central unit through the communication interface. A base station may be connected to other radio access network nodes by another communication interface, for example, gNB 120 may communicate with one or more other gNBs 120 through an Xn interface. A central unit may communicate with other gNBs 120 over an Xn-C interface. It is appreciated that some example embodiments described herein may be implemented at a gNB 120, or divided between a gNB-CU 122 and a gNB-DU 126.

A central unit of a base station, for example gNB-CU 122, may comprise a logical node such as gNB-CU-CP (gNB-CU-Control Plane) for handling control plane communications, for example for hosting the radio resource control (RRC) and control plane of the packet data convergence protocol (PDCP). The central unit may further comprise a logical node such as gNB-CU-UP (gNB-CU-User Plane) for handling user plane communications, for example for hosting user plane part of the PDCP protocol, the service data adaptation protocol (SDAP), or the like. A base station may comprise one logical control plane unit (gNB-CU-CP) and one or more logical user plane units (gNB-CU-UP). As discussed above, a central unit may be coupled to one or more distributed units.

Base stations may be also called radio access network (RAN) nodes. AMF/UPF 130, gNB 120, gNB-CU 122, gNB-DU 126, and ML host 140 may be generally referred to as network nodes. Although depicted as a single device, a network node may not be a stand-alone device, but for example a distributed computing system coupled to a remote radio head.

Network 100 may be configured for example in accordance with the 5th Generation digital cellular communication network, as defined by the 3rd Generation Partnership Project (3GPP). In one example, network 100 may operate according to 3GPP 5G-NR (5G New Radio). It is however appreciated that example embodiments presented herein are not limited to this example network and may be applied in any present or future wireless or wired communication networks, for example other type of cellular networks, short-range wireless networks, broadcast networks, or the like.

Figure 2:
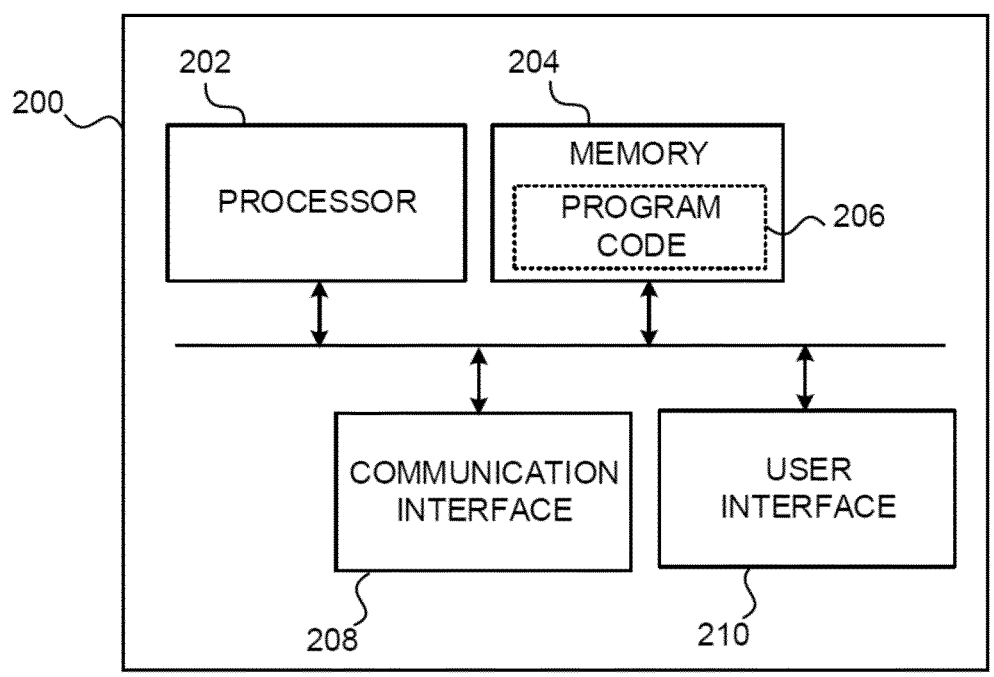
FIG. 2 illustrates an example of an apparatus configured to perform one or more example embodiments.

FIG. 2 illustrates an example of an apparatus 200 according to an example embodiment, for example a network node such as UE 110, gNB 120, and/or ML host 140. Apparatus 200 may comprise at least one processor 202. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 204. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise communication interface 208 configured to enable apparatus 200 to transmit and/or receive information, for example messages to/from other devices. In one example, apparatus 200 may use communication interface 208 to transmit or receive information in accordance with a cellular communication protocol. The communication interface may be configured to provide at least one wireless radio connection, such as for example a 3GPP mobile broadband connection (e.g. 3G, 4G, 5G). However, the communication interface may be configured to provide, alternatively or additionally, one or more other type of connections, for example a wireless local area network (WLAN) connection such as for example according to IEEE 802.11 series or Wi-Fi alliance specifications; a short range wireless network connection such as for example a Bluetooth, NFC (near-field communication), or RFID connection; a local wired connection such as for example a local area network (LAN) connection or a universal serial bus (USB) connection, or the like; or a wired Internet connection. Communication interface 208 may comprise, or be coupled to, at least one antenna to transmit and/or receive radio frequency signals.

Apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 206 comprised, for example, in the memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus comprises means for performing at least one method described herein. In one example, the means comprises the at least one processor, the at least one memory including program code configured to, when executed by the at least one processor, cause the apparatus to perform the method.

Apparatus 200 may comprise for example a computing device such as for example a server, mobile phone, a tablet computer, a laptop, an internet of things (IoT) device, or the like. Examples of IoT devices include, but are not limited to, consumer electronics, wearables, sensors, and smart home appliances. In one example, apparatus 200 may comprise a vehicle such as for example a car. Although apparatus 200 is illustrated as a single device it is appreciated that, wherever applicable, functions of apparatus 200 may be distributed to a plurality of devices, for example to implement example embodiments as a cloud computing service.

Figure 3:
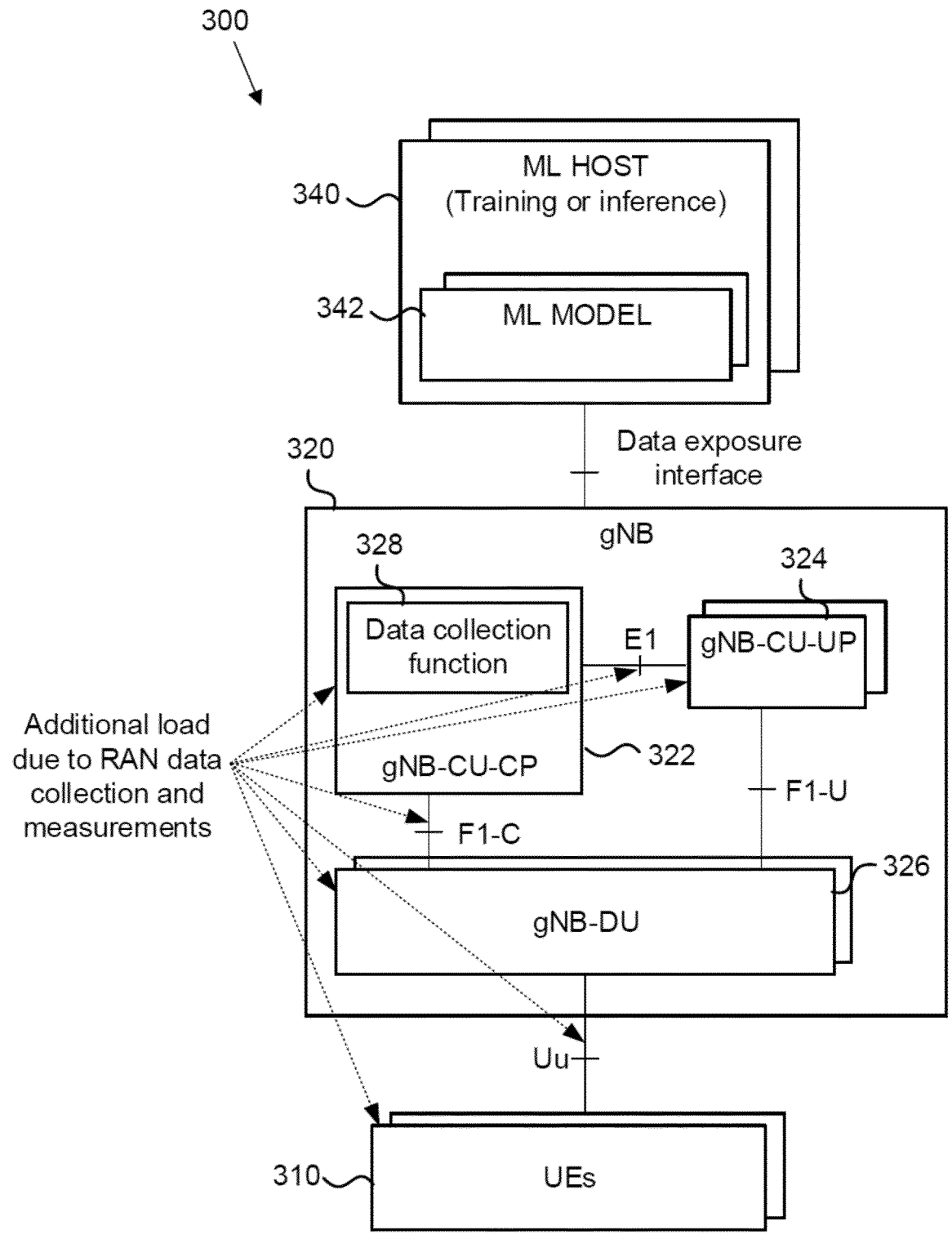
FIG. 3 illustrates an example of data collection in a radio access network, according to an example embodiment.

FIG. 3 illustrates an example of data collection in a radio access network. Network 300 may comprise one or more ML hosts 340, one or more gNBs 320, and one or more UEs 310, similar to ML host 140, gNBs 120, and UEs 110 of FIG. 1. The gNB 320 is provided as an example of a radio access network (RAN) node.

The ML host 340 may comprise one or more machine learning (ML) models 342 configured to perform various inference and/or training tasks. ML model 342 may comprise any suitable ML or AI model, for example an artificial neural network. ML models 342 may be configured for various tasks such as for example to predict network traffic and to optimize network parameters. Even though ML host 340 is depicted as a separate network node, in some embodiments it could be embedded in gNB 320, or other network node.

ML host 340 may be coupled to gNB 320 over an interface, such as for example the data exposure interface. The gNB 320 may be implemented for example as a central unit gNB-CU and one or more distributed units gNB-DU 326. The central unit may comprise a control plane function represented by gNB-CU-CP 322, and one or more user plane functions represented by gNB-CU-UP 324. The control plane function may communicate with the user plane function for example over an E1 interface. The user plane function and control plane function may communicate with the distributed units for example over control plane (F1-C) and a user plane (F1-U) parts of an F1 interface, respectively. The distributed units 326 may communicate with the UEs 310 over a radio interface, for example an Uu interface.

The control plane function of the central unit may comprise a data collection function (DCF) 328, which may be configured to receive requests for data collection from ML host 340, retrieve network information from one or more other network nodes such as for example gNB-DUs 326, and report the received network information over the data exposure interface to the ML host 340 for execution at one or more ML models 342. However, the data collection function 328 could be implemented any suitable manner either within gNB 320 or as a separate network node. Furthermore, the same functionality could be implemented with a monolithic RAN architecture. The network information may comprise any information suitable for input for the one or more ML models 342, for example operating parameters or radio conditions associated with different network devices such as gNB 320 or UEs 310.

FIG. 3 illustrates possible sources for additional load or cost to the system due to data collection or measurements associated with the data collection. For RAN information exposure it is possible that a plurality of ML hosts 140 may request data from the same gNB 320. This may lead to collection of a high amount of data with strong latency requirements. Depending on the use case, various data interfaces and network entities may be affected. For example, the collected radio level information may be stored at gNB-DU 326 and communicated via the F1 interface. A cost of storing the radio level information may be for example determined based on volume of the storage. A transport cost may be determined based on amount of information signaled via the F1 interface. According to another example, a delay measurement of packets through the network may comprise following a packet data unit (PDU) from gNB-CU-UP 324 to a medium access control (MAC) entity of the gNB-DU 326. This may cause a cost due to adding a processing task at one or more protocol layers, for example SDAP, PDCP, RLC (radio link control), and/or MAC, to trace the PDU and measure for example a delay from SDAP to the MAC and physical layer. Furthermore, gNB 320 may determine to configure UEs 310 for measurements in order to fulfil the data exposure request received from the ML host(s) 340. This may increase power consumption at UEs 310 and/or signaling load at the radio interface. In other words, there is some cost for exposing the RAN information and it is desired to provide means for controlling that cost.

Figure 4:
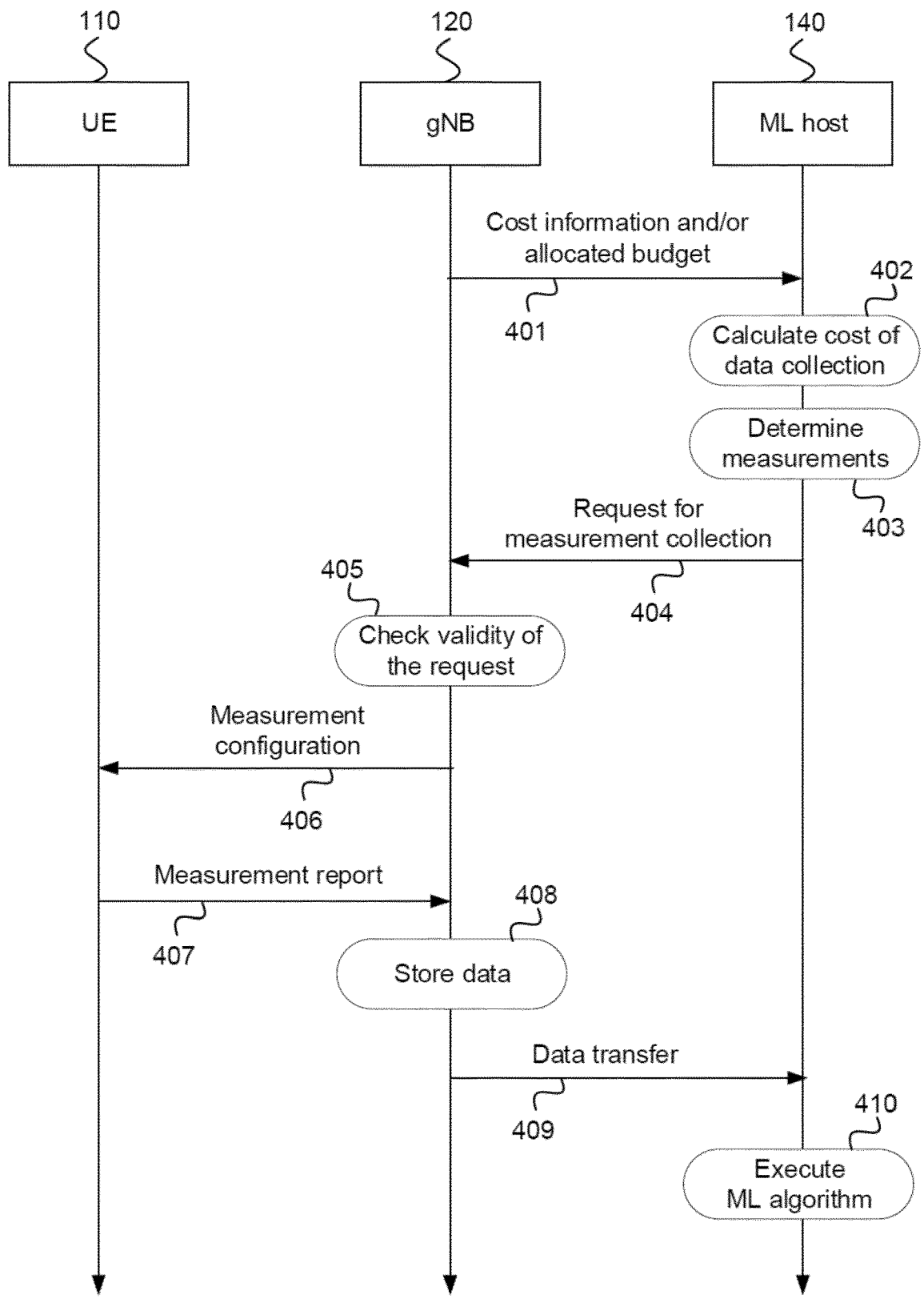
FIG. 4 illustrates an example of operations performed at an ML host, a gNB, and user equipment (UE), according to an example embodiment.

FIG. 4 illustrates an example of operations performed at an ML host 140, a gNB 120, and a user equipment (UE) 110. At 401, the gNB 120 may transmit cost information and/or allocated budget to ML host 140. The transmitted information may for example comprise an indication of a cost budget and/or at least one cost value. The indication of the cost budget and the at least one cost value may be included in a single message or they may be transmitted as separate messages. In one example, the information includes a plurality of cost values associated with a plurality of data collection tasks.

Before transmitting the information at 401, the gNB 120 may be configured to determine the at least one cost value, which may be associated with collecting network information. For example, for each data to be exposed to ML host 140, the gNB 120 may associate a cost value. The cost value may be derived from different factors, for example based on a cost function, and it may vary over time. Examples of data for which certain cost value may be allocated include for example retrieving location of a UE 110 or measuring a neighbouring intra-frequency cell by a UE 110.

According to an example embodiment, the cost value may be determined based on power consumption at a user equipment associated with at least one operation, for example a measurement or provision of particular data. The power consumption at UE 110 may be estimated by gNB 120. For example, gNB 120 may be preconfigured with power consumption estimates for a plurality of operations at UE 110. Alternatively, power consumption for a particular operation may be estimated based on one or more power consumption reports associated with same or similar operations received from UE 110. The gNB 120 may also request and/or receive a power consumption estimate from UE 110. The power consumption estimate may be associated with a particular task to be performed at UE 110.

For example, collecting a location of a plurality of UEs 110 may cause additional power consumption due to GPS reception and computing the location based on the received GPS signals. Determining power consumption for requesting location of N UEs 110 may comprise determining estimated power consumption P, for example in Joules, for a single UE and determining a cost value associated with the request by $N*P$.

According to an example embodiment, the cost value may be determined based on at least one radio resource associated with the at least one measurement. The at least radio resource may be for example required for performing the at least one measurement. For example, the at least one radio resource may comprise radio resource(s), for example a message, used for sending measurement results. Alternatively, or additionally, the at least one radio resource may comprise resources wasted when interrupting another task in order to perform a measurement at UE 310. For example, UE may be configured to tune its receiver to another frequency or stop transmitting to avoid interference during measurement. The cost may be expressed for example in bits indicating the wasted capacity.

According to an example embodiment, the cost value may be determined based on a signaling load at one or more network interfaces associated with collecting network information, for example signaling load inflicted at one or more RAN internal interfaces such as the E1 and/or F1 interface. As discussed above, the additional signaling load at F1 interface may be caused by signaling the collected radio level information. In the E1 interface, the additional signaling load may be caused for example by detailed traffic record(s) per UE 310. This information may be collected at gNB-CU-UP 324 and forwarded to gNB-CU-CP 322 via the E1 interface. A detailed traffic record may comprise the number of packets or bits per bearer, or the number of packets or bits per a quality of service (QoS) indicator, for example 5QI (5G QoS indicator). The cost value may be expressed for example as number of bits allocated for transmitting certain information, for example to report intra-frequency neighboring cells. Determining the cost value may further comprise scaling the cost based on a type of interface.

According to an example embodiment, the cost value may be determined based on processing load at the one or more network nodes associated with collecting the network information, for example processing load inflicted at one or more RAN internal entities such as gNB-CU-UP 324 and/or gNB-DU 126. Additional processing load may be caused for example due to following a packet data unit at one or more protocol layers to perform delay measurements, as discussed above. In another example, additional processing load may be caused when computing UE position based on UE measurements, such as for example beam measurements at gNB-DU 326, which may require calculations, computation power, and storage and transport of the data to gNB-CU. Processing load may be estimated for example based on measured processing load caused by previous data collection tasks, which may be reported by the relevant network node to other network node(s).

Different cost values may be reported separately or they may be combined into to one cost value comprising a total cost associated with a particular data request or a plurality of data requests.

The gNB 120 may be further configured to determine the cost budget associated with collecting network information. The cost budget provides means for the gNB 120 to control the additional resource usage due to data exposure. Different cost budgets may be allocated to exposing data to different network entities. The cost budget(s) may be dynamically updated based on network load, received data exposure requests, and/or cost budgets previously granted to different network entities. The gNB 120 may also revoke already granted requests, for example based on changes in the cost budget(s). The gNB 120 may also determine whether the cost budget allocation needs to be changed and inform the consumer, for example ML host 140, accordingly, for example based on transmitting an indication of a change in at least one cost budget. According to an example embodiment, there may be a plurality of cost budgets for cost values expressed in different units.

According to an example embodiment, the cost budget may comprise at least one threshold value for at least one cost function. The cost function may comprise components associated with various parameters such as for example power consumption at a user equipment associated with at least one measurement, at least one radio resource associated with the at least one measurement, signaling load at one or more network interfaces associated with collecting the network information, and/or or processing load at the one or more second network nodes associated with collecting the network information. An estimate of the power consumption may be obtained based on preconfigured estimates for different measurements, based on information about power consumption associated with similar measurements, or based on requesting and/or receiving a power consumption estimate from UE 110, as discussed above. The signaling load may comprise signaling load at one or more RAN internal interfaces such as for example the F1 or E1 interface.

The cost function may comprise a sum or any other suitable combination of the different components of the cost function. A cost budget may be defined for cost values that are expressed in the same unit. However, costs may be measured with different quantities for different components. For example, a cost may be measured in number of bits when the cost is related to an amount of data, in Joules when the cost is related to energy, or any other unit suitable for representing the different costs. Components of the cost function may be expressed as or converted into a scalar number such that they can be combined with other components. For example, a first component may comprise increased power consumption, which could be expressed for example as an energy value in Joules. A second component may comprise increased signaling load, which could be expressed for example as number of bits needed for signalling particular data. The cost function may combine the different components for example as a weighted sum in order to adjust influence of each component to the determined cost value.

The ML host 140 may receive the indication of the cost budget and/or at least one cost value associated with collecting network information. At 402, the ML host 140 may calculate cost for collecting particular set of network data. The set of network data may be determined for example based on the task to be performed by the ML model(s) 342 associated with the ML host 140, 340. The set of network data may be determined based on the cost budget and the at least one cost value received from gNB 120, for example such that the cost caused by collecting the set of network data is within the cost budget. For example, at 403 the ML host 140 may determine one or more measurements to be requested in order to collect the set of network data.

At 404, ML host 140 may transmit a request for the set of network data to gNB 120. The request may comprise a request for measurement collection. The request may indicate a priority for one or more subsets of the set of network data. For example, gNB 120 may use the priority information to determine which subsets to collect if it is not possible to collect the entire set of requested network data. The request may be sent after checking that the data collection task does not exceed the cost budget. For example, the ML host 140 may be configured to determine at least one cost value for the determined set of network data, and transmit the request for the set of network data if the cost value is within the cost budget. If the cost value is not within the cost budget, the ML host 140 may determine a subset of the set of network data as a new set of network data to be requested. Alternatively, the ML host 140 may transmit a request to increase the cost budget, for example as a subscription request. The initially received default cost values may be referred to as first cost values and the cost values determined for the selected set of network data may be referred to as second cost values.

In response to receiving the request for the set of network data, the gNB 120 may check validity of the request at 405. The gNB 120 may initially determine default cost values for exposing different data. Upon receiving the request for the set of network data, gNB 120 may determine at least one current cost value associated with collecting the requested set of network data. Based on the at least one current cost value, which may differ from the default cost values transmitted to ML host 140 at 401, the gNB 120 may further determine whether it grants the request. For example, gNB 120 may determine that the requested data implies a cost that exceeds at least one threshold defined in the cost budget and therefore it may reject the request. However, in some example embodiments checking the validity of the request may be optional.

Checking validity of the request enables gNB 120 to ensure that changes in the network occurred after reporting the default cost values do not cause the cost budget to be exceeded. For example, UE 110 may have moved close to the cell edge and therefore cost caused by the requested measurements may have increased. Therefore, determining the at least one current cost value may comprise updating the at least one current cost value in response to receiving the request for the set of network data. Updating the cost value(s) may be based on various parameters such as for example an updated location of UE 110. The initial or default cost values reported at 401 may be referred to as first cost values and the current cost values determined for a particular set of network data requested at 404 may be referred to as second cost values.

According to an example embodiment, at 405 gNB 120 may determine that the at least one cost value is within the cost budget if the at least one cost value does not exceed the at least one threshold value.

According to an example embodiment, the cost budget may comprise a threshold value associated with a single request. For example, gNB 120 may be configured not to grant a data exposure request if the sum of cost values associated with that request exceeds the threshold. The threshold, $B_R$, may be determined to be exceeded for example if $B_R > \Sigma_i\, m_i$, where $m_i, i \in M_R$ is the cost of a measurement in a set of configured measurements $M_R$ for request R.

According to an example embodiment, the cost budget may comprise a threshold value associated with a plurality of requests. The threshold value may be associated with a cost function comprising a sum of cost values associated with the plurality of requests. For example, gNB 120 may be configured not to grant a data exposure request if the sum of cost values associated with a plurality of admitted requests exceeds the threshold. The threshold, $B_T$, may be determined to be exceeded for example if $B_T > \Sigma_k R_k$, where $R_k$, $k \in K$ denotes a request and K is the set of admitted requests. In response to accepting a data request, gNB 120 may add the cost of the latest admitted request to the total running cost, which is not allowed to exceed the threshold value. The total running cost may be session specific. For example, the total running cost may be initiated upon initiating a session and cleared upon termination of the session. A session may for example comprise a data collection campaign. A data collection campaign may comprise a logical association between at a RAN node such as gNB 320 and the ML host 340. The data collection campaign may be characterized by one or more performance indicators, for example KPIs (key performance indicator), and/or parameters to be collected. Depending on the data collection campaign and its performance indicators, different costs may be included. A network node may be associated with a plurality of data collection campaigns, which may be active at the same time.

According to an example embodiment, the cost budget may comprise a threshold value associated with a plurality of requests for at least one user equipment. The threshold value may be associated with a cost function comprising a sum of cost values associated with the plurality of requests for the at least one user equipment. For example, gNB 120 may be configured not to grant a data exposure request if the sum of cost values associated with a user equipment exceeds the threshold. The threshold may be associated with a particular UE, a group of UEs, or any UE. The threshold, $B_{UE}$, may be determined to be exceeded for example if $B_{UE} > \Sigma_j m_j$, where $m_j, j \in M_{UE}$ is the cost of a measurement configured for a UE 110 and $M_{UE}$ is the set of measurements configured for a UE 110.

According to an example embodiment, if collecting the requested set of data causes the cost budget to be exceeded, the gNB 120 may determine a subset of network data to be collected. Determining which subset(s) to collect may be based on priority information included in the request for the set of network data received at 404. If the cost budget prevents collecting all of the requested set of network data, gNB 120 may determine the set of network data to be collected as a subset of the set of network data requested by ML host 140.

At 406, for example in response to determining that the at least one cost value for the requested set of data, or a subset thereof, is within the cost budget, gNB 120 may transmit a request for the set of network data to one or more other network nodes, for example UE 110. The request may be transmitted for example as a measurement configuration message over RRC protocol, or by other means.

At 407, gNB 120 may receive the set of network data from the one or more second network nodes, for example UE 110. The set of network data may be received for example as one or more measurement reports. The measurement reports may comprise the measured data. The measurement reports may comprise information about resources consumed for obtaining the requested data, for example power consumption of radio resource usage when performing requested measurements. Handling received request for data collection, checking validity of the requests, obtaining the requested data from other network nodes, and/or reporting the data may be performed at a central unit of a base station, for example by the data collection function 328, which may or may not be implemented as part of gNB-CU-CP function 322.

At 408, gNB 120 may store the set of network data. The stored data may be for example used to estimate resources needed for collecting similar data when receiving further data collection requests from ML host 140.

At 409, gNB 120 may transmit the set of network data to the ML host 140. At 410, ML host 140 may execute an ML algorithm based on the set of network data received from gNB 120.

According to an example embodiment, a consumer, for example ML host 140, may subscribe to an available cost budget at a RAN node, for example gNB 120. For example, the ML host 140 may transmit a subscription request for a data collection service. The gNB 120 may receive the subscription request from ML host 140. In response to receiving the subscription request, the gNB 120 may allocate the cost budget to the first network node based on information included in the subscription request. The subscription request may for example indicate a requested cost budget. The gNB 120 may determine the granted cost budget based on the requested cost budget and/or currently available cost budget at gNB 120. If a data collection request received from a subscriber exceeds the allocated cost budget, gNB 120 may transmit an indication of the exceeded cost budget to the subscriber.

According to an example embodiment, in response to determining that a cost value associated with a request for a set of network data received from ML host 140 is not within the cost budget, gNB 120 may determine to defer collection of the requested set of network data. The gNB 120 may transmit an indication of the deferred data collection request to the ML host 140. The gNB 120 may later, for example periodically, check whether sufficient cost budget could be allocated. If budget becomes available for the deferred data collection request, gNB 120 may determine to initiate data collection from other network nodes without further request from the ML host 140. This enables opportunistic request of RAN information exposure.

Example embodiments enable to control resource usage due to data collection in a radio access network. Furthermore, example embodiments enable standardize control of the cost and transparency of the cost associated with data collection for the data consumer or subscriber.

Figure 5:
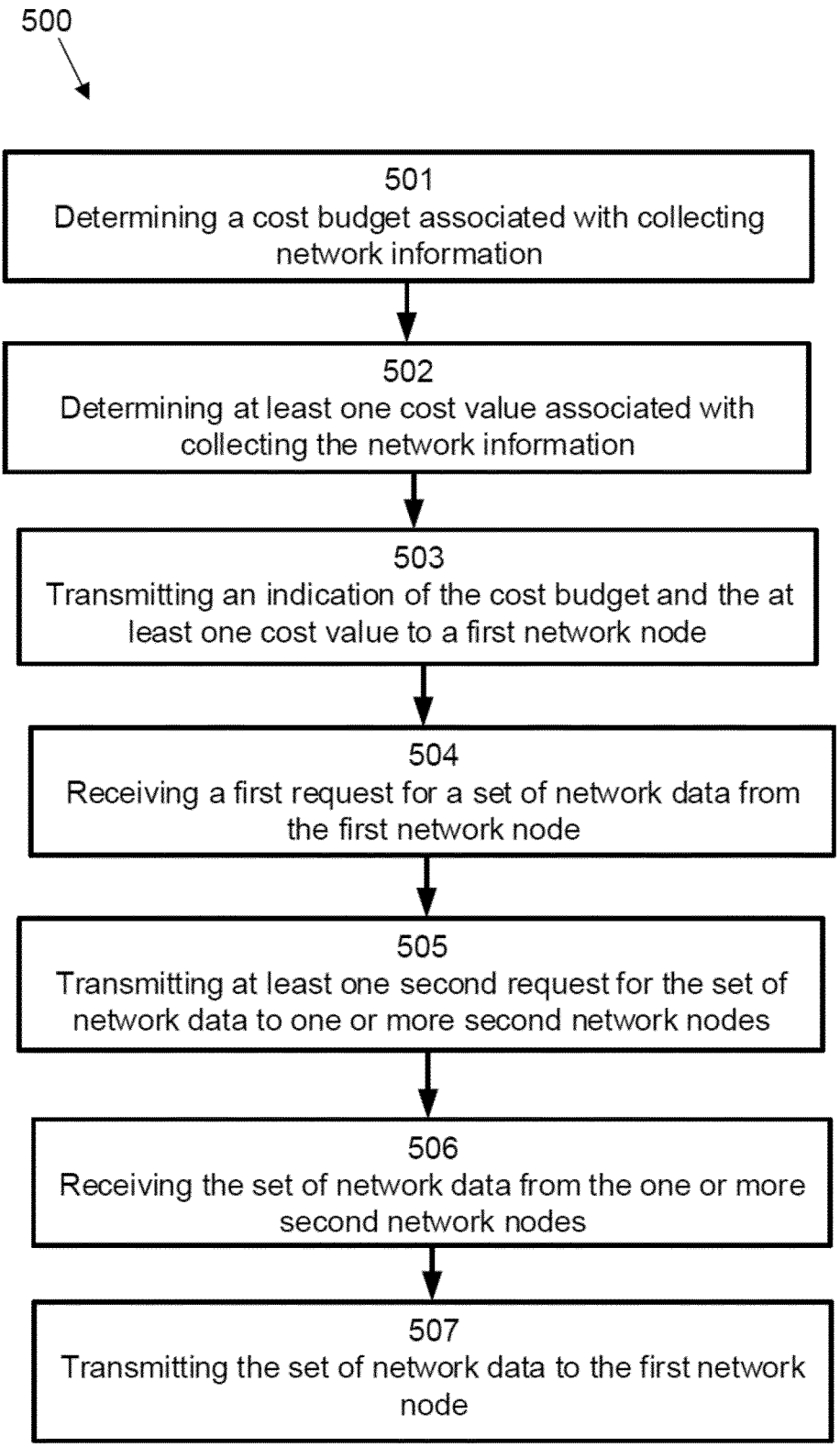
FIG. 5 illustrates an example of a method for collecting a set of network data, according to an example embodiment; ands

FIG. 5 illustrates an example of a method 500 for collecting a set of network data, according to an example embodiment.

At 501, the method may comprise determining a cost budget associated with collecting network information.

At 502, the method may comprise determining at least one cost value associated with collecting the network information At 503, the method may comprise transmitting an indication of the cost budget and the at least one cost value to a first network node.

At 504, the method may comprise receiving a first request for a set of network data from the first network node.

At 505, the method may comprise transmitting at least one second request for the set of network data to one or more second network nodes.

At 506, the method may comprise receiving the set of network data from the one or more second network nodes.

At 507, the method may comprise transmitting the set of network data to the first network node.

According to an example embodiment, the cost budget may comprise at least one threshold value for at least one cost function.

According to an example embodiment, the cost function may comprise at least one of power consumption at at least one user equipment associated with at least one measurement, at least one radio resource associated with the at least one measurement, signaling load at one or more network interfaces associated with collecting the network information, or processing load at the one or more second network nodes associated with collecting the network information.

According to an example embodiment the method may further comprise determining at least one second cost value associated with collecting the set of network data and transmitting a request for the set of network data to the one or more second network nodes in response to determining that the second cost value is within the cost budget.

According to an example embodiment the method may further comprise determining that the at least one second cost value is within the cost budget if the at least one second cost value does not exceed the at least one threshold value.

According to an example embodiment the cost budget may comprise at least one of a first threshold value associated with a single request, a second threshold value associated with a plurality of requests, or a third threshold value associated with a plurality of requests for the at least one user equipment.

According to an example embodiment the second threshold value may be associated with a cost function comprising a sum of cost values associated with the plurality of requests. The third threshold value may be associated with a cost function comprising a sum of cost values associated with the plurality of requests for the at least one user equipment.

According to an example embodiment the method may further comprise determining the at least second cost value based on updating the at least one cost value in response to receiving the request for the set of network data.

According to an example embodiment the cost value may be updated based on an updated location of the at least one user equipment.

According to an example embodiment the method may further comprise determining to defer transmission of the at least one second request in response to determining that the second cost value is not within the cost budget.

According to an example embodiment the method may further comprise receiving a subscription request for a data collection service from the first network node. The subscription request may comprise an indication of a requested cost budget and allocating the cost budget to the first network node based on the subscription request.

Figure 6:
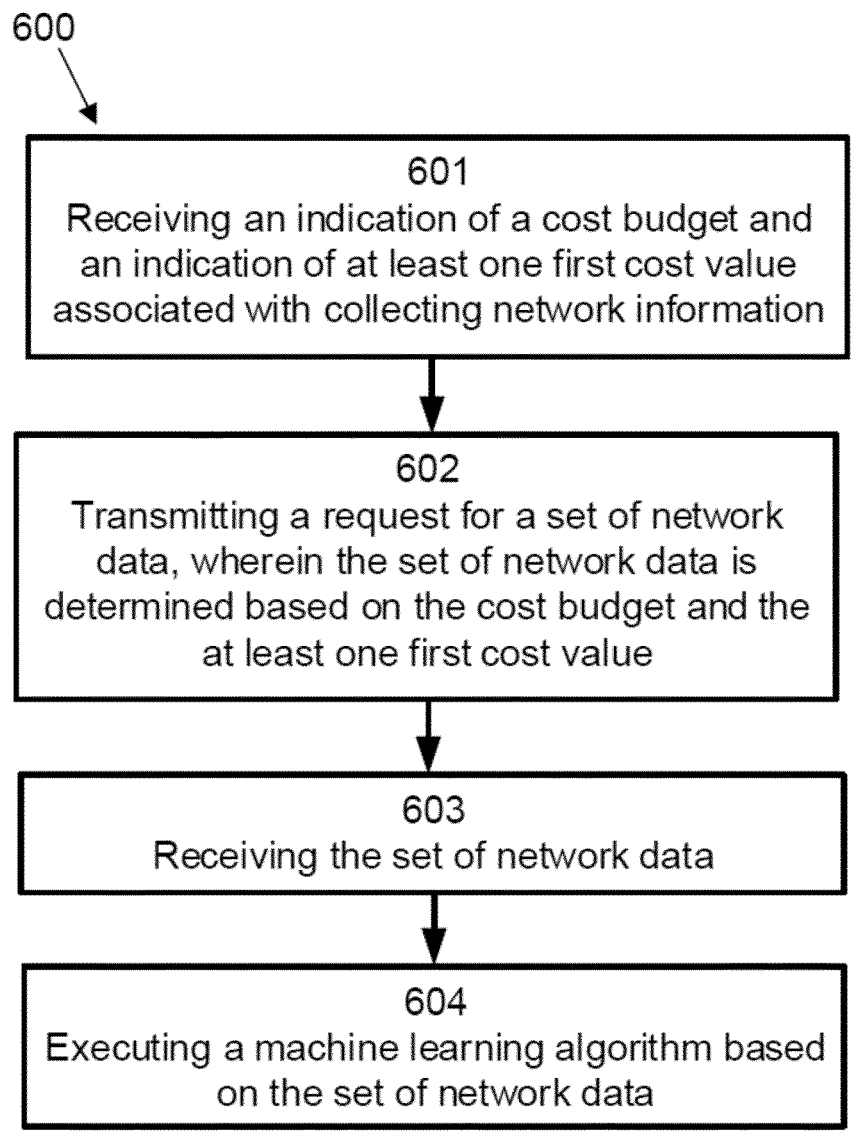
FIG. 6 illustrates an example of a method for requesting a set of network data for a machine learning algorithm, according to an example embodiment.

FIG. 6 illustrates an example of a method 600 for requesting a set of network data for a machine learning algorithm, according to an example embodiment.

At 601, the method may comprise receiving an indication of a cost budget and an indication of at least one first cost value associated with collecting network information.

At 602, the method may comprise transmitting a request for a set of network data, wherein the set of network data is determined based on the cost budget and the at least one first cost value.

At 603, the method may comprise receiving the set of network data.

At 604, the method may comprise executing a machine learning algorithm based on the set of network data.

According to an example embodiment the cost budget may comprises at least one threshold value for at least one cost function.

According to an example embodiment the cost function may comprise at least one of power consumption at least one user equipment associated with at least one measurement, at least one radio resource associated with the at least one measurement, signaling load at one or more network interfaces associated with collecting the network information, or processing load at one or more network nodes associated with collecting the network information.

According to an example embodiment the method may further comprise determining at least one second cost value for the set of network data and transmitting the request for the set of network data if the second cost value is within the cost budget.

According to an example embodiment the cost budget may comprise at least one of a first threshold value associated with a single request, a second threshold value associated with a plurality of requests, or a third threshold value associated with a plurality of requests for the at least one user equipment.

According to an example embodiment the second threshold value may be associated with a cost function comprising a sum of cost values associated with the plurality of requests. The third threshold value may be associated with a cost function comprising a sum of cost values associated with the plurality of requests for the user equipment.

According to an example embodiment the method may further comprise transmitting a subscription request for a data collection service. The subscription request may comprise an indication of a requested cost budget.

Further features of the methods directly result from the functionalities and parameters of the network nodes, for example UE 110, gNB 120, or ML host 140, as described in the appended claims and throughout the specification.

An apparatus, for example UE 110, gNB 120, or ML host 140 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:
1. An apparatus comprising:
at least one processor; and
at least one memory including computer program code;
the at least one memory and the computer code configured to, with the at least one processor, cause the apparatus at least to:
receive an indication of a cost budget and an indication of at least one first cost value associated with collecting network information;
transmit a request for a set of network data, wherein the set of network data is determined based on the cost budget and the at least one first cost value;
receive the set of network data; and
execute a machine learning algorithm based on the set of network data;
wherein the cost budget is dynamically updated based on network load, received data exposure requests, and cost budget previously granted to different network entities,
wherein the cost budget comprises at least one threshold value for at least one cost function, power consumption at at least one user equipment associated with at least one measurement, at least one radio resource associated with the at least one measurement, signaling load at a plurality of network interfaces associated with collecting the network information, and processing load at a plurality of network nodes associated with collecting the network information, and
wherein the cost budget comprises a first threshold value associated with a single request, a second threshold value associated with a plurality of requests, and a third threshold value associated with a plurality of requests for the at least one user equipment,
wherein the apparatus is further caused to determine at least one second cost value for the set of network data, and transmit the request for the set of network data if the second cost value is within the cost budget, and transmit a subscription request for a data collection service, wherein the subscription request comprises an indication of a requested cost budget, and
wherein the cost budget is transmitted in a first message and the cost value is transmitted in a second message,
wherein the first cost value and the second cost value are combined into a third cost value comprising a total cost associated with a plurality of data requests, and
wherein a plurality of cost budgets for cost values are expressed in different units from one another,
wherein the first cost value is an initially received default cost value and the second cost value is a cost value determined for a selected set of network data, and wherein the second threshold value and the third threshold values are calculated in accordance with the following equation: $B_T > \Sigma_k R_k$, where $B_T$ denotes the associated second and third thresholds, $R_k$, $k \in K$ denotes a request and K is the set of admitted requests.

* * * * *